(12) United States Patent
Chang et al.

(10) Patent No.: US 7,813,263 B2
(45) Date of Patent: Oct. 12, 2010

(54) METHOD AND APPARATUS PROVIDING RAPID END-TO-END FAILOVER IN A PACKET SWITCHED COMMUNICATIONS NETWORK

(75) Inventors: Rong-Feng Chang, Irvine, CA (US); Eric Lin, Irvine, CA (US); Craig Barrack, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 952 days.

(21) Appl. No.: 10/903,437

(22) Filed: Jul. 30, 2004

(65) Prior Publication Data

US 2006/0002292 A1 Jan. 5, 2006

Related U.S. Application Data

(63) Continuation-in-part of application No. 10/881,226, filed on Jun. 30, 2004, now Pat. No. 7,760,719.

(51) Int. Cl.
*G01R 31/08* (2006.01)
*G06F 11/00* (2006.01)

(52) U.S. Cl. ........................... 370/216; 370/225

(58) Field of Classification Search ........................... None
See application file for complete search history.

(56) References Cited

U.S. PATENT DOCUMENTS

| | | | |
|---|---|---|---|
| 5,748,905 A | 5/1998 | Hauser et al. | |
| 6,229,787 B1 * | 5/2001 | Byrne | 370/218 |
| 6,229,978 B1 | 5/2001 | Naito et al. | |
| 6,370,666 B1 | 4/2002 | Lou et al. | |
| 6,697,873 B1 | 2/2004 | Yik et al. | |
| 6,763,479 B1 | 7/2004 | Hebert | |
| 6,963,566 B1 | 11/2005 | Kaniz et al. | |
| 7,107,359 B1 | 9/2006 | Burton et al. | |
| 7,251,745 B2 * | 7/2007 | Koch et al. | 714/11 |
| 7,450,507 B2 | 11/2008 | Tundlam et al. | |

(Continued)

FOREIGN PATENT DOCUMENTS

CN   1499780   5/2004

(Continued)

OTHER PUBLICATIONS

First Foreign Office Action for JP2005190649 mailed Mar. 11, 2008.

(Continued)

*Primary Examiner*—Ayaz R Sheikh
*Assistant Examiner*—Sori A Aga
(74) *Attorney, Agent, or Firm*—Thomas, Kayden, Horstemeyer & Risley, LLP

(57) ABSTRACT

A hardware-based failover scheme enabling rapid end-to-end recovery is provided. Hardware logic periodically generates, transmits, receives, and processes heartbeat packets, sent from one end of the communications network to another, and then returned back. If a communications network node or communications link failure is being experienced along the transport path, then the hardware logic rapidly swaps the affected traffic conveyed to a pre-established backup transport path, typically within microseconds. Advantages are derived from the rapid failover effected end-to-end which enables continued delivery of provisioned communications services improving the resiliency and/or availability of a communications network.

20 Claims, 6 Drawing Sheets

U.S. PATENT DOCUMENTS

| | | | |
|---|---|---|---|
| 7,457,297 | B2 | 5/2010 | Woo et al. |
| 2002/0054604 | A1 | 5/2002 | Kadambi et al. |
| 2002/0085560 | A1 | 7/2002 | Cathey et al. |
| 2002/0116442 | A1 | 8/2002 | Modelski et al. |
| 2002/0116521 | A1 | 8/2002 | Paul et al. |
| 2002/0186683 | A1* | 12/2002 | Buck et al. .................. 370/352 |
| 2003/0012137 | A1* | 1/2003 | Abdelilah et al. ........... 370/229 |
| 2003/0053448 | A1 | 3/2003 | Craig et al. |
| 2003/0088698 | A1* | 5/2003 | Singh et al. ................. 709/239 |
| 2003/0214945 | A1 | 11/2003 | Kawamura |
| 2003/0231625 | A1 | 12/2003 | Calvignac et al. |
| 2004/0013118 | A1* | 1/2004 | Borella .................... 370/395.2 |
| 2004/0032872 | A1 | 2/2004 | Dhara |
| 2004/0037319 | A1 | 2/2004 | Pandya |
| 2004/0085894 | A1 | 5/2004 | Wang et al. |
| 2004/0146044 | A1 | 7/2004 | Herkerdorf et al. |
| 2005/0125557 | A1 | 6/2005 | Vasudevan et al. |
| 2005/0147028 | A1 | 7/2005 | Na et al. |
| 2005/0220104 | A1* | 10/2005 | Tsujikado et al. ........... 370/390 |
| 2006/0129631 | A1* | 6/2006 | Na et al. .................... 709/203 |

FOREIGN PATENT DOCUMENTS

| | | |
|---|---|---|
| EP | 1416671 A2 | 5/2004 |
| JP | H0273746 | 3/1990 |
| JP | H08163242 | 6/1996 |
| JP | H09198334 | 7/1997 |
| JP | 2000286896 | 10/2000 |
| JP | 2001211203 | 8/2001 |
| JP | 2001297016 | 10/2001 |
| JP | 2002044150 | 2/2002 |
| JP | 2002051080 | 2/2002 |
| JP | 2002271379 | 9/2002 |
| JP | 2002290428 | 10/2002 |
| JP | 2003008581 | 1/2003 |
| JP | H02003188905 | 7/2003 |
| JP | 2003273930 | 9/2003 |
| JP | 2003298660 | 10/2003 |
| JP | H09135252 | 5/2010 |

OTHER PUBLICATIONS

Second Foreign Office Action for JP2005190649 mailed Dec. 16, 2008.
Third Foreign Office Action for JP2005190649 (Decision of Rejection) mailed Jun. 30, 2009.
Notification Application passed to Appeal Examiners for JP2005190649 mailed Mar. 2, 2010.
First Office Action for CN200510080731.2 mailed Dec. 21, 2007.
Second Office Action for CN200510080731.2 mailed Aug. 29, 2008.
Rejection Decision for CN200510080731.2 mailed Apr. 3, 2009.
Third Office Action for CN200510080731.2 mailed Jan. 8, 2010.
First Foreign Office Action for DE102005029396.4-31 mailed Nov. 29, 2006.
Second Foreign Office Action for DE102005029396.4-31 mailed March 26, 2009.
First Foreign Office Action for CN2005100807261 mailed Jan. 4, 2008 (Abstract Only).
Second Foreign Office Action for CN2005100807261 mailed Jun. 30, 2008.
Third Foreign Office Action for CN2005100807261 mailed Mar. 13, 2009.
"Gigabit Ethernet Swithes Using a Shared Buffer Architecture" Michael V. Lau, IEEE Communication Magazine, pp. 76-84, Dec. 2003.

* cited by examiner

METHOD AND APPARATUS PROVIDING RAPID END-TO-END FAILOVER IN A PACKET SWITCHED COMMUNICATIONS NETWORK

RELATED APPLICATION

This patent application is is a continuation-in-part of commonly assigned U.S. patent application Ser. No. 10/881,226 filed Jun. 30, 2004.

FIELD OF THE INVENTION

The invention relates to packet-switched communications, and in particular to methods and apparatus for detecting network failures and providing rapid end-to-end failover.

BACKGROUND OF THE INVENTION

Failover is one of the most highly desired functions in a modern communications network. The failover function automatically detects a communications link or a communications network node failure experienced in a communications network, and switches the affected traffic onto alternate paths away from the failed communications link or failed communications network node. The process of switching the affected traffic from one path to another must happen rapidly enough so as to protect high-priority, high bandwidth, or real-time flows from experiencing disruptions.

Existing schemes that provide failover rely on either the Layer 2 spanning tree protocol described in IEEE 802.1d protocol, which is incorporated herein by reference, and/or Layer-3 routing control protocols such as, but not limited to: the Border Gateway Protocol (BGP), Cisco's Interior Gateway Routing Protocol (IGRP), Open Shortest Path First (OSPF), all of which are incorporated herein by reference. Employing the Layer-2 scheme, the spanning tree protocol dynamically modifies an acyclic set of edges that spans the network whenever a communication link and/or a communications network node fail. At Layer-3, routing control protocols compute alternative routes whenever the communications network topology changes, including due communications link or communications network node failures.

However, neither one of the above two schemes provides failover that is sufficiently rapid so as to prevent service disruptions for high-priority, high bandwidth, or real-time services. The typical convergence time of the spanning tree protocol, the time taken to compute a new spanning tree, is around 45 seconds. Recently, a rapid spanning tree protocol IEEE 802.1w, which is incorporated herein by reference, has been proposed for reducing the expected convergence time to 5 seconds for a very small spanning tree/communications network. Accordingly, the convergence time for a large spanning tree/communications network is still in the tens of seconds, measured at 5 additional seconds for every extra hop. Layer-3 route re-computations are equally slow.

The related art includes co-pending commonly assigned U.S. patent application Ser. No. 10/284,856 entitled "High Availability Ethernet Backplane Architecture" filed by Wang et al. on Oct. 31, 2002, and co-pending and commonly assigned U.S. patent application Ser. No. 10/326,352 entitled "Apparatus for Link Failure Detection on High Availability Ethernet Backplane" filed by Wang et al. on Dec. 20, 2002 which is a continuation-in-part of U.S. patent application Ser. No. 10/284,856; both of which are incorporated herein by reference. These related co-pending and commonly assigned U.S. patent applications describe communications-network-node-based failover functionality wherein redundant node boards and redundant switch fabric boards routinely perform attached communications link integrity checks such that each can independently initiate failover to working ports when a link failure is detected.

While the related art describes desirable inventive and effective hop-by-hop failover communications-network-node-based functionality, there is a need to provide rapid end-to-end failover functionality.

SUMMARY OF THE INVENTION

An object of the present invention is to address the above mentioned failover issues.

In accordance with an aspect of the invention, methods and apparatus for improving failover performance of a communications network is provided.

In accordance with another aspect of the invention, a communications network node for performing one of packet switching and routing in processing packets associated with at least one communications session provisioned over a communications network is provided. In support of the failover functionality, the network node includes: a hardware classifier for associating one of at least one received data packet and at least one heartbeat packet with a traffic flow corresponding to the communication session; a hardware heartbeat processor for asserting that the traffic flow is affected by a network failure based on information derived from the at least one heartbeat packet; and a hardware failover module for switching each data packet associated with the affected flow onto a failover transport path.

In accordance with yet another aspect of the invention, a method of providing end-to-end failover protection for a monitored session provisioned across a communications network over a transport path is provided. The method includes: generating a heartbeat request packet based on information held in packet headers of packets conveyed in respect of the monitored session; transmitting the heartbeat request packet addressed to a destination network address specified in the headers of the packets conveyed in respect of the monitored session; selectively asserting that the monitored session is affected by a network failure encountered in the transport path across the communications network; and switching data packets associated with the affected monitored session to a corresponding failover transport path.

Advantages are derived from the rapid failover effected end-to-end which enables continued delivery of provisioned communications services improving the resiliency and/or availability of a communications network.

BRIEF DESCRIPTION OF THE DRAWINGS

The features and advantages of the invention will become more apparent from the following detailed description of the exemplary embodiments with reference to the attached diagrams wherein.

It will be noted that in the attached diagrams like features bear similar labels.

DETAILED DESCRIPTION OF THE EMBODIMENTS

In accordance with an exemplary embodiment of the invention, a hardware-based failover scheme enabling rapid end-to-end recovery is provided.

The architecture of an exemplary communications network node providing support for fast end-to-end failover functionality is described in co-pending and commonly assigned U.S. patent application Ser. No. 10/881,226 entitled "Combined Pipelined Classification and Address Search Method and Apparatus for Switching Environments" filed on Jun. 30, 2004 by Yik et al. which is incorporated herein by reference.

In accordance with the exemplary embodiment of the invention, an architecture of an end-to-end failover mechanism of a packet switching node is provided. Rapid failover is an important function which attempts to guarantee continued provisioning of critical end-to-end services without disruption due to localized failures of a communications network.

In accordance with the exemplary embodiment of the invention, hardware logic associated with compliant communications network nodes, perform operations on heartbeat packets to detect communications network failures in effecting rapid failover end-to-end. Compliant communications network nodes, periodically generate and transmit heartbeat packets from one end of the communications network to another and back, in order to probe the operational status communications network node infrastructure used by packets conveyed in respect of protected sessions as the packets are conveyed along a transport path across the communications network. If a network failure somewhere along the probed path is detected, then hardware logic automatically switches traffic conveyed in respect of a protected end-to-end session to a predefined failover stand-by path, without the intervention of a management processor. Therefore end-to-end protection against network failures is provided which is responsive to failed communications network infrastructure along the path through a communications network between a source and a destination.

Monitoring a protected session via heartbeat packets assumes that the heartbeat packets and the data packets associated with the same session content flow traverse an identical transport path across the communications network from source to destination. This assumption may not always be valid in respect of Internet Protocol (IP) communications networks, which typically employ best-effort and non-deterministic packet forwarding techniques. For example: load balancing may be employed wherein a router may select different routes for packets with the same destination IP address. However, in most communications networks, the assumption is valid, especially in a well-controlled environment, such as a 3G IP communications network or a private network.

Figure 1:
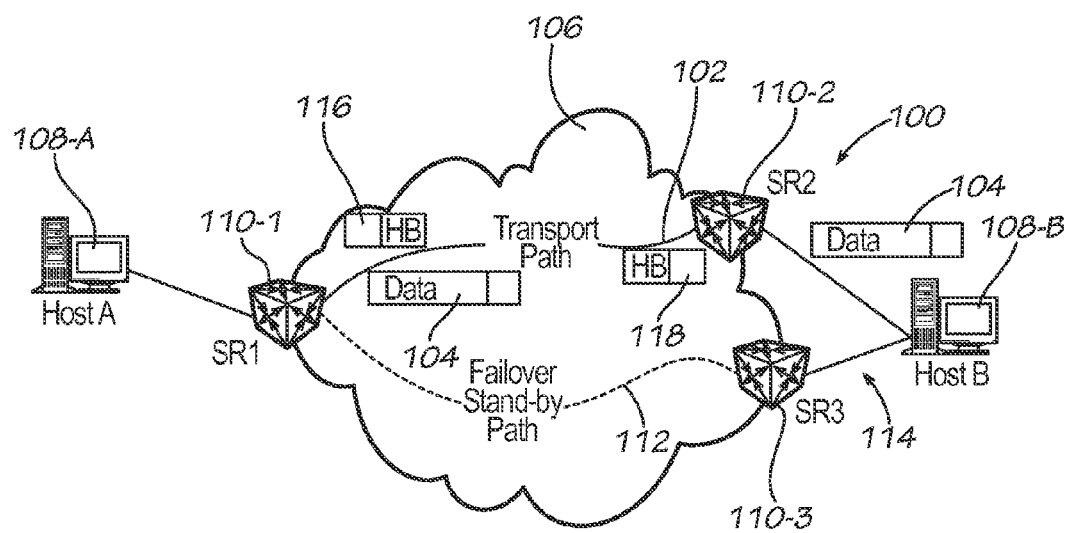
FIG. 1 is a schematic diagram showing, in accordance with an exemplary implementation of an exemplary embodiment of the invention, services provisioned over a path traversing a communications network and a heartbeat packets exchanged normal conditions.

FIG. 1 illustrates an exemplary high-level architecture of an exemplary system 100. A transport path 102 conveys packets 104 for at least one protected session across the communications network 106. Packets 104 bearing communication session identifiers are generated by host 108-A and sent to host 108-B and traverse the communications network 106 from Switch/Router 110-1 (SR) to SR 110-2. Packets 104 transported via the transport path 102 exit the communications network 106 at SR 110-2 and are sent to host node 108-B via a distribution portion 114 of the communications network 106. A corresponding failover stand-by path 112 is provisioned a priori, following a different route in the communications network 106, between SR 110-1 and SR 110-3. The host 108-B also has a downlink (114) connected to SR 110-3.

During normal operation, SR 110-1 monitors the status of protected sessions employing transport path 102 by periodically sending a heartbeat packet 116 towards host 108-B. Upon receiving each heartbeat packet 116, SR 110-2 replies by returning a heartbeat packet 118 traveling in the opposite direction destined for SR 110-1. In accordance with another implementation of the invention, heartbeat packets 116 may be conveyed across the distribution portion 114 of the communications network 106 to a customer premise equipment (exemplified by host node 108-B) such as a customer router which implements the exemplary embodiment of the invention. In accordance with such an implementation the end-to-end failover protection is provided also in respect of failures experienced by the distribution portion 114 of the communications network 106.

Figure 2:
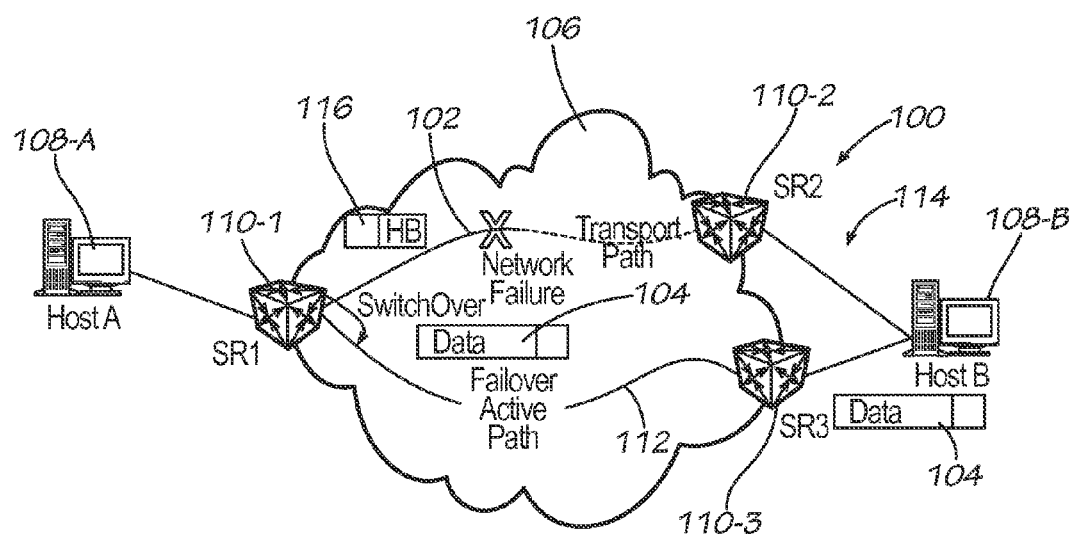
FIG. 2 is a schematic diagram showing, in accordance with another exemplary implementation of the exemplary embodiment of the invention, a protected session experiencing a network failure wherein content transport in respect of the protected session is switched over to a failover transport path.

Making reference to FIG. 2, if SR 110-1 does not receive a heartbeat packet 118 reply within a predefined period of time, then a failure condition 120 is asserted in respect of the protected session to have been encountered somewhere along the transport path 102. SR 110-1 switches over all packet traffic conveyed in respect of the protected session from transport path 102 to the failover backup path 112. In accordance with an exemplary implementation of the exemplary embodiment of the invention, the failover backup path 112 is normally deactivated so as to conserve deployed resources in the communications network 106, in which case prior to switching the content traffic over to the failover stand-by path 112, the failover stand-by path 112 is activated.

In the above, an association between content packets 104 and the protected transport path 102 was hinted at. In practice, packet traffic 104 is labeled with communication session/packet flow identifiers, the protected transport path 102 being associated with a communications session and/or a packet flow. The association of a packet with a particular communication session/packet flow is determined by a packet classifier component of SR 110-1. Typically, in determining the association of each packet 104 to a communications session/packet flow, the packet classifier employs rules applied to at least one packet header field value carried along in the header of each packet 104. Therefore classified packets 104 can be directed either to the working protected transport path 102 or to the failover backup path 112 for the associated session/ packet flow, depending on the operational status of the communications network infrastructure traversed by the transport path 102.

In accordance with the exemplary embodiment of the invention, switching packet traffic over to the failover backup path 112 is performed in hardware either by changing the destination Media Access Control (MAC) ADDRess, or both the destination IP ADDR and the destination MAC ADDR in headers of packets associated with protected sessions which have encountered a network failure.

Figure 3:
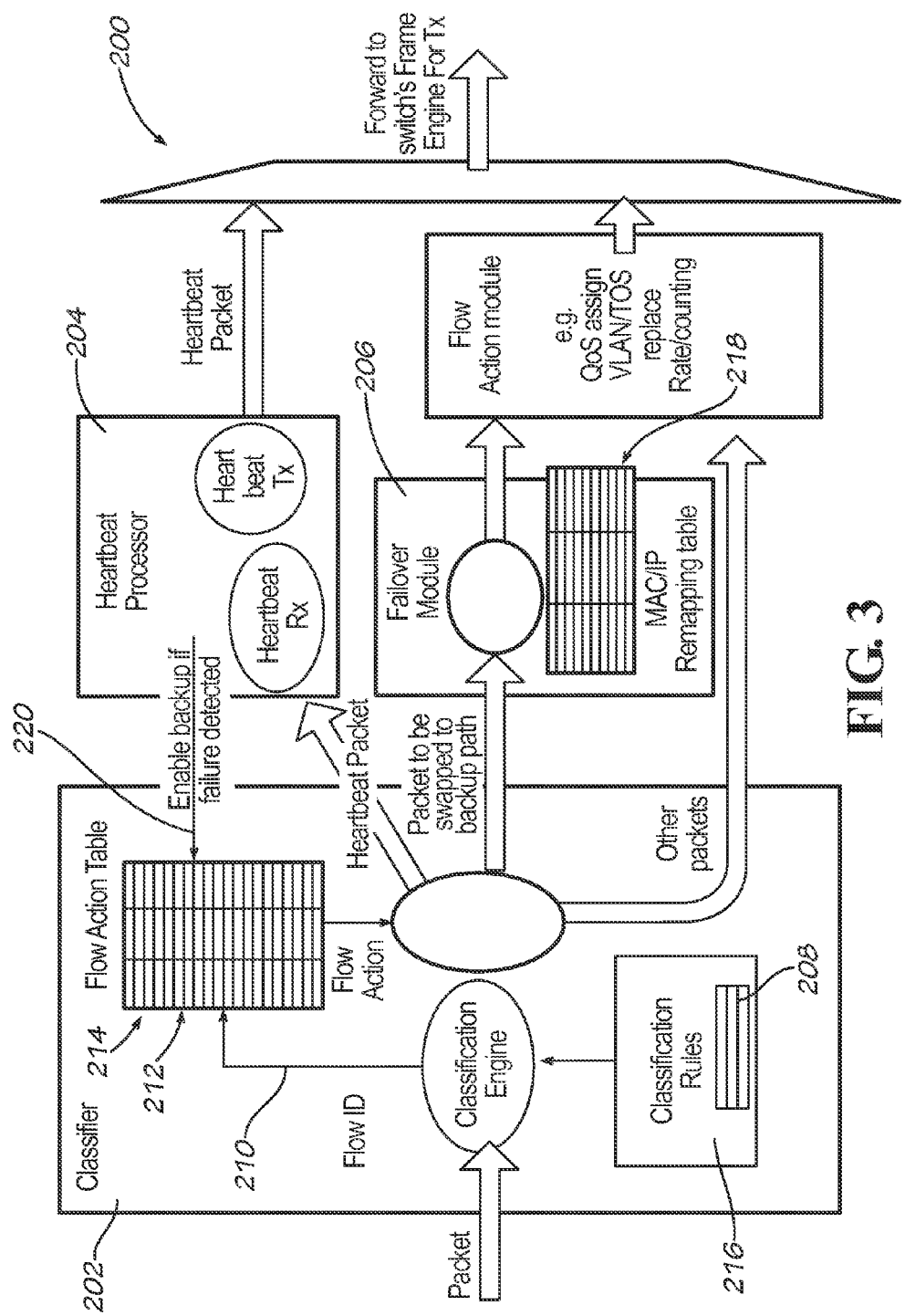
FIG. 3 is a schematic diagram showing, in accordance with the exemplary embodiment of the invention, switching/router network node elements implementing an exemplary failover mechanism.

An exemplary architecture 200 of the failover mechanism is illustrated in FIG. 3 showing three primary modules being employed by communications network equipment implementing the exemplary embodiment of the invention. Each module is described in more detail herein below.

A classifier 202 is employed to:
identify heartbeat packets (both requests 116 and replies 118);
forward heartbeat packets 116/118 to a heartbeat processor 204; and
identify data packets 104 that belong to protected sessions/flows.

The heartbeat processor 204 is employed to:
periodically generate outgoing heartbeat request packets 116;
process incoming heartbeat reply 118 packets identified by the classifier 202;
assert the existence of network failures, from the heartbeat packets 116/118; and
if the existence of a network failure is asserted in respect of a protected session/flow, informing a failover module 206 of that assertion.

A failover module 206 is employed for switching packets belonging to a particular session/flow from a working transport path 102 to a backup transport path 112, by replacing network addresses in headers of packets associated with the protected session/flow.

In accordance with the exemplary embodiment of the invention, the classifier 202 categorizes received packets 104/116/118 into flows by matching field values in packet headers against a set of hardware-instantiated classification rules. Multiple sessions of a traffic group may be categorized as belonging to a single flow, and packets associated with multiple sessions and flows may be conveyed along a particular transport path 102. An exemplary implementation of the classifier 202 is presented in the above identified priority U.S. patent application Ser. No. 10/881,226. Other exemplary implementations include: the use of Ternary Content Addressable Memory (TCAM), the use of a microsequencer, or the use of a hardware state machine. Once a received packet 104/116/118 matches a classification rule 208, the packet 104/116/118 is associated with a session/flow and is assigned a corresponding session/flow ID 210. A flow is a collection of packets all of which match the same classification rule 208; which is understood to mean that the packets belong to a session or traffic group. The flow ID 210 is then used to reference a corresponding entry 212 in a flow action table 214, entry 212 which specifies actions to be taken on all packets that belong to the corresponding flow. Although heartbeat packets are generated in respect of communications sessions, because a flow may constitute a single session, packet processing at a switch/router 110 as described herein may simply be understood in terms of flow actions and in all such respects the terms "session" and "flow" are used interchangeably with the understanding that a flow is protected by the virtue of constituent session being protected via heartbeat packets. For a detailed description of flow actions please refer to the above referenced priority U.S. patent application Ser. No. 10/881,226, the relevant flow actions herein concern the processing of heartbeat packets 116/118 and actions effecting failover.

In accordance with an exemplary end-to-end failover implementation, the source network node SR 110-1 is configured to operate in accordance with two classification rules 208 for each protected session. The first rule identifies heartbeat packets 116/118 for each protected session. The second rule 208 identifies corresponding data packets 104 for each protected session.

Defining the classification rules 208 that identify heartbeat packets 116/118 and data packets 104 is very flexible. An exact match can be made on multiple packet header fields, with wildcards for increased flexibility. For example, classification rules 208 may be configured to match on combinations of the following fields:

| Field Name | Description |
| --- | --- |
| Egress port | Packet's outgoing port. May be a physical port or a trunk port |
| Ingress port | Packet's port of arrival. |
| Destination MAC | Destination MAC address |
| Source MAC | Source MAC address |
| VLAN ID | 12-bit VLAN identifier |
| Ethertype / DSAP + SSAP | Ethertype field for packets in Ethernet-II or SNAP format. For 802.3 LLC format, this field contains DSAP + SSAP |
| SIP | Source IP address |
| DIP | Destination IP address |
| Protocol ID | Protocol identifier field in the IP header |
| Source-L4 | Source UDP/TCP port |
| Destination-L4 | Destination UDP/TCP port |
| User defined field | Any 8-bit user-defined field |

In accordance with an exemplary implementation, each classification rule 208 also has an associated 3-bit weighting. If the classification of packet 104/116/118 returns multiple matches corresponding to multiple rules, the classifier 202 selects a rule 208 based on rule weights.

In operation, the classifier 202 compares the specific multiple fields of the packet header, to the values in each of the classification rules 208 (taking into account any wildcards), the rule weights are used to select between multiple matches, and finally produces a single rule 208 that matches the packet header "best". If multiple rules are matched the rule with the highest weight is selected as the matched rule. It is possible for rules to have the same weight.

Figure 4:
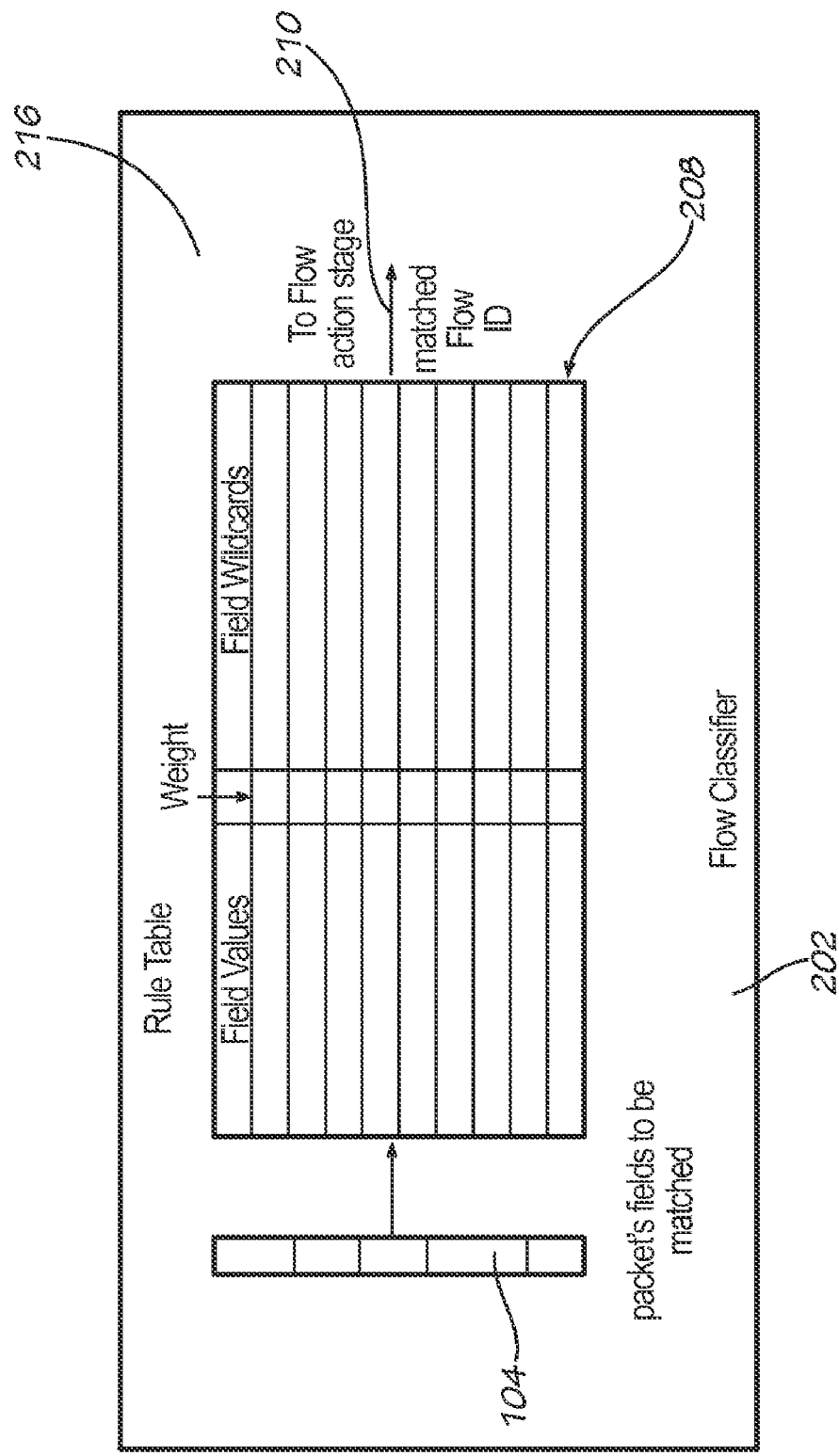
FIG. 4 is a schematic diagram showing, in accordance with the exemplary embodiment of the invention, an exemplary architecture of a packet classifier.

Making reference to FIG. 4 the rules 208 are specified as entries in a classification rule table 216, each classification rule table entry has an identifier associated with a flow ID 210. If multiple rules 208 having the same weight are matched, then, depending on the particular implementation, the rule 208 with either the highest or the lowest rule entry identifier is selected.

In accordance with an exemplary implementation of the exemplary embodiment of the invention, the matched classification rule table entry identifier is used as the flow ID 210.

After a received packet is assigned a flow ID 210, the classifier 202 uses flow ID 210 as an index in performing a table look-up into the flow action table 214. Each flow action table entry 212 in the flow action table 214 specifies a list of the actions to be performed on packets belonging to the cor responding flow. For example, in each entry 212, an action code identifies a primary action to be performed, and associated parameters may also be specified. Each entry 212 in the flow action table 214 specifies the following exemplary information:

Two fields, in particular: action code and Destination Port Map/Heartbeat Field/Forwarding Index, relate to failover functionality. The following table describes the relevant exemplary action codes and related parameters:

| Action code | Destination Port Map / Heartbeat Field / Forwarding Index Bits[28:0] | Action |
| --- | --- | --- |
| 011: Action on heartbeat packet | Bits[5:0] = Failover session ID when Bit[7] = 1<br>Bit[6] = 0 if Heartbeat Reply; 1 if Heartbeat Request (initiated by remote node)<br>Bit[7] = 0 if ICMP format; 1 if generic mode using a configurable format | Pass the session ID, heartbeat request/reply bit, and packet format bit, along with the heartbeat packet itself, to the heartbeat processor 204 for further processing. |
| 100: Action on data packet belonging to a protected flow with L2 failover | Bits[5:0] = Index into Destination MAC remapping table 218<br>Bit[6] FLOVF-E<br>Bit[7] FLOVE-S<br>Bit[8] FLOVE-H | When a failure has been detected in respect of a monitored session, traffic is swapped to the failover path 112 using a new destination MAC ADDR, contained in the entry of the Destination MAC remapping table 218. Provide the index to the failover module 206 for address remapping. |
| 101: Action on data packet belonging to a protected flow with L3 failover | Bits[5:0] = Index into Destination IP remapping table 218<br>Bit[6] FLOVF-E<br>Bit[7] FLOVE-S<br>Bit[8] FLOVE-H | When a failure has been detected in respect of a monitored session, traffic is swapped to the failover path 112 by using a new destination IP address, contained in the entry of the Destination IP remapping table 218. Provide the index to the failover module 206 for address remapping. | an action code: An encoding of the flow action to be undertaken in respect of/on the packet;
a Destination Port Map/Heartbeat Field/Forwarding Index: This flow action table entry field has multiple meanings depending on the action code;
VLAN ID Replace: Enable replacement of VLAN ID;
VLAN ID: the substitution value for VLAN ID replacement;
XP/DP Replace: Enable replacement of transmission priority and dropping precedence;
XP: substitution value for transmission priority replacement;
DP: substitution value for dropping precedence replacement;
Snoop: copy this packet to a mirror port;
Port ID: the mirror port specification;
TOS Remap: Enable replacement of TOS/DSCP field in the IP header
TOS/DSCP: substitution value for TOS/DSCP field replacement;
802.1p Remap: replace the 802.1p field (VLAN priority) in the packet header;
802.1p: substitution value for 802.1p field replacement;
Rate Metering: Enable rate metering for this flow;
Counting: Enable statistics collection for this flow; and
Metering/Counter Index: index value for metering/counting for the flow.

The present description will focus only on failover related actions, for details regarding other flow actions supported please refer to the above mentioned co-pending commonly assigned priority U.S. patent application Ser. No. 10/881,226. A flow action module determines a comprehensive set of actions, most of which are unrelated to failover functionality, to be performed on a packet that has been associated with a particular flow. If one of the actions is failover related, the necessary actions are performed by failover module 206.

As exemplary shown above, three flags/bits are used to enable or disable failover functionality:

FLOVF-E: Failover Function Enable flag/bit, if set to logic high "1", the failover mechanism is enabled for the corresponding flow, which means that traffic 104 will be transferred to a specified failover path 112 once a network failure has been asserted in respect of the monitored session.

FLOVE-H: Hardware Enable flag/bit, is typically initialized to logic low "0", by the hardware logic 200. When the heartbeat processor 204 asserts a that a network failure affects a protected session, the heartbeat processor 204 sets this bit to logic high "1". If FLOVF-E is also set to 1 (i.e. automatic failover functionality is enabled), then automatic failover to a corresponding failover transport path 112 will ensue.

FLOVE-S: Software Enable flag/bit is set by high level switch/router 110 control providing for switching content traffic 104 onto the failover transport path 112 if both FLOVE-S and FLOVF-E are set, bypassing the network failure assertion by the hardware logic 200.

In summary, in accordance with the exemplary implementation of the exemplary embodiment of the invention, the hardware logic 200 will perform MAC and/or IP address remapping in hardware for a particular protected session if and only if, for the flow corresponding to the session, (FLOVF-E=1) AND (FLOVE-H=1 OR FLOVE-S=1) is logically true. If the requirement (logical expression) is not satisfied, then each packet 104 constituent of the protected session will be forwarded via the transport path 102.

In accordance with an exemplary implementation of the exemplary embodiment of the invention, when the heartbeat processor 204 asserts that a network failure is being experienced by a flow directing packets to be transported across the communications network along the transport path 102, by sending a signal 220 to the classifier 202 specifying the corresponding flow ID. Upon receiving signal 220, the classifier 202 sets the FLOVE-H bit to "1" for that flow.

In accordance with the exemplary embodiment of the invention, the failover module 206 performs the destination MAC address or destination IP address replacement necessary to switch from a packet from a failed path to a backup path.

The classifier 202 provides the failover module 206 with the following information:

Action code—Destination MAC ADDR or Destination IP ADDR replacement;
  Monitored session ID;
  Packet to be modified;
  Other flow action parameters unrelated to failover functionality, which will be later passed to a flow action module 222; and
  A switch response for the packet.

A preliminary switch response is generated by the classifier 202 as exemplary described in the above mentioned co-pending commonly assigned priority U.S. patent application Ser. No. 10/881,226, and contains the information needed for the switching function of the switch/router node 110 to properly transmit the packet 104. The switch response contains a large number of fields, the fields relevant to failover functionality include:

| Field | Description |
| --- | --- |
| Destination Bit Map | The egress port map. A packet will be transmitted to all ports for which the corresponding bit in the destination map contains a 1. |
| VLAN Tag Out Bits | Indicates with a 1, for each port, whether the packet, if forwarded on that port, will be transmitted with a VLAN tag. |
| VLAN TCI | VLAN Tag Control Information including 12-bit VLAN ID and 3-bit 802.1p priority |
| Recompute CRC | If set to 1, the packet's CRC must be recalculated and replaced. |
| Replace Source MAC ADDR | If set to 1, the source MAC address must be replaced in the packet header with the egress port's MAC ADDR for routing packets only. |

When the classifier 202 provides the failover module 206 with a remapping task to, the failover module 206 uses the monitored session ID as an index to an appropriate row of the remapping table 218, each entry in the table includes:

D-IP ADDR specifying the destination IP address for switching the monitored session. This entry is used only for destination IP address replacement.
  Destination Bit Map specifies the egress port map of for switching the monitored session.
  VLAN TCI indicates the new VLAN ID and 802.1p priority to be used in switching the monitored session.
  VLAN Tag Out specifies the VLAN Tag Out map for a new VLAN, indicating with a 1, for each port, whether the packet, if forwarded on that port, will be transmitted with a VLAN tag).
  DMAC indicates the destination MAC address for switching the monitored session. Indicates the next-hop MAC address if Layer-3 remapping is to take place.

If the action code for processing a packet signifies L2 address remapping, then after extracting information from the correct entry of the remapping table 218, the functionality of failover module 206 includes:

modifying the preliminary switch response, by replacing the destination bit map, VLAN tag out bits and VLAN TCI with values specified in the remapping table entry;
  replacing the destination MAC address in the packet header with the value specified in the remapping table entry; and
  setting the re-compute Cyclic Redundancy Check (CRC) bit in the switch response to logic high "1" as the packet header has been modified.

If however the action code for processing a packet signifies L2 and L3 address remapping, the functionality of the failover module 206 will differ depending on whether the packet is bridged or routed. A packet is routed if an L2 database search results in associating the destination MAC address with the management processor port. Also, whenever the destination IP address is changed, the Layer 3 (IP) and Layer 4 checksums (either UDP or TCP) also must change. The table below lists the actions taken in each of four IP remapping scenarios.

The IP checksum and TCP or UDP checksums can be recalculated incrementally, taking into account only the modification to the destination IP address (and TTL, if applicable) as described in IETF RFC 1624, which is incorporated herein by reference.

In all cases, the information in the remapping Table 218 is used to modify the packet header and switch response:

| Scenario | Modify the packet header | Modify the switch response |
| --- | --- | --- |
| Packet is bridged; packet is not UDP or TCP | Replace Destination MAC address<br>Replace Destination IP address<br>Recalculate and replace IP checksum | Replace destination bit map<br>Replace VLAN TCI<br>Replace VLAN tag out bits<br>Set the Re-compute CRC bit |
| Packet is bridged; packet is UDP or TCP | Replace Destination MAC address<br>Replace Destination IP address<br>Recalculate and replace IP checksum<br>Recalculate and replace UDP or TCP checksum | Replace destination bit map<br>Replace VLAN TCI<br>Replace VLAN tag out bits<br>Set the Re-compute CRC bit |
| Packet is routed; packet is not UDP or TCP | Replace Destination MAC address<br>Replace Destination IP address<br>Decrease Time to Live (TTL) in IP header by 1<br>Recalculate and replace IP checksum | Replace destination bit map<br>Replace VLAN TCI<br>Replace VLAN tag out bits<br>Set the Re-compute CRC bit<br>Set the Replace SMAC bit |
| Packet is routed; packet is UDP or TCP | Replace Destination MAC address<br>Replace Destination IP address<br>Decrease TTL by 1<br>Recalculate and replace IP checksum<br>Recalculate and replace UDP or TCP checksum | Replace destination bit map<br>Replace VLAN TCI<br>Replace VLAN tag out bits<br>Set the Re-compute CRC bit<br>Set the Replace SMAC bit |

In accordance with the exemplary embodiment of the invention, heartbeat request messages are encapsulated in heartbeat packets 116 sent in the same direction as the associated monitored session data packets 104, from source to destination, along the transport path 102. Heartbeat reply messages are encapsulated in heartbeat packets 118 sent in the reverse direction, from destination to source, to notify the sender SR 110-1 that corresponding heartbeat requests were received.

In accordance with an implementation of the exemplary embodiment of the invention, heartbeat packets 116/118 have an Internet Control Message Protocol (ICMP) format. ICMP is a mandatory protocol for IP routers and hosts, and is widely implemented. Using the default ICMP format benefits from interoperability with other vendors' equipment. In particular ICMP heartbeat request packets 116 may be directed to the destination host node 108-B of a protected session if the host node 108-B implements the ICMP protocol extending the reach of the solution, however the generation of corresponding heartbeat reply packets 118 may incur delays if the functions of the ICMP protocol are executed in software as is typical of end host nodes.

The following is an exemplary heartbeat ICMP echo request packet format, employed for heartbeat packets 116:

| 0 | | 15 | 16 | | 31 |
|---|---|---|---|---|---|
| Version | IHL | TOS | | Total Length | |
| | ID | | Flag | Fragment Offsets | |
| TTL | | Protocol ID (=0x01) | | Header Checksum | |
| Source IP Address | | | | | |
| Destination IP Address | | | | | |
| ICMP Type (=0x08) | ICMP Code (=0x00) | | ICMP Header Checksum | | |
| ICMP Identifier (session ID embedded in lower byte) | | | Sequence Number | | |

The following is an exemplary heartbeat ICMP echo reply packet format, employed for heartbeat packets 118:

| 0 | | 15 | 16 | | 31 |
|---|---|---|---|---|---|
| Version | IHL | TOS | | Total Length | |
| | ID | | Flag | Fragment Offsets | |
| TTL | | Protocol ID (=0x01) | | Header Checksum | |
| Source IP Address | | | | | |
| Destination IP Address | | | | | |
| ICMP Type (=0x00) | ICMP Code (=0x00) | | ICMP Header Checksum | | |
| ICMP Identifier (session ID embedded in lower byte) | | | Sequence Number | | |

Note that the ICMP identifier field is two bytes long, and is generally used to match ICMP echo requests with their associated replies. In accordance with the exemplary embodiment of the invention, the monitored session ID is embedded in the lower byte: the ICMP type of an echo request is 0x08, and the ICMP type of an echo reply is 0x00.

In accordance with another implementation of the exemplary embodiment of the invention, heartbeat packets 116/118 have a flexible generic non-ICMP format which may be programmed by operations management personnel to completely meet application needs. Although the generic format provides an improved flexibility, the failover mechanism may not be interoperable with other end nodes.

As mentioned herein above the classifier 202 identifies a heartbeat packet 116/118 and forwards it to the heartbeat processor 204. For a heartbeat packet having a generic format, the session ID and an indication of whether the encapsulated heartbeat message is a request or reply are provided by the classifier 202 as retrieved from the flow action table 214. For a heartbeat packet 116/118 having an ICMP format, the information is extracted from the packet header by the heartbeat processor 204, as described above.

In accordance with the exemplary embodiment of the invention, the heartbeat processor 204 keeps track of heartbeat packet information employing a record per protected session, each record providing the information necessary to generate heartbeat packets and to monitor the status of a session:

an enable flag enables periodic transmission of heartbeat request packets 116 for a corresponding session;

an operations management personnel configured heartbeat packet format—a programmable format for request heartbeat packets 116 for each monitored session. Applicable only when a generic heartbeat packet format is employed;

an operations management personnel configured switch response specifying information needed for switching the packet 116/118 in forwarding the packet 116/118 including information such as, but not limited to: a destination map, VLAN specification, and a priority specification (as described herein above);

a transmission period specification: a programmable time interval between consecutive heartbeat request message (116) transmissions for a protected session, exemplary in units of 0.1 ms;

a transmission timer keeps track of the time elapsed since a heartbeat request message (packet 116) was sent for a particular session, exemplary in units of 0.1 ms;

a programmable repetition threshold specifies the number of consecutive heartbeat request messages (packages 116) that can be sent without a single reply having been received, before it is asserted that the monitored session has encountered a network failure;

a repetition counter tracks the number of consecutive heartbeat request messages (packets 116) sent without a single reply having been received; and A flow ID 210 specification is associated with the protected session.

Figure 5:
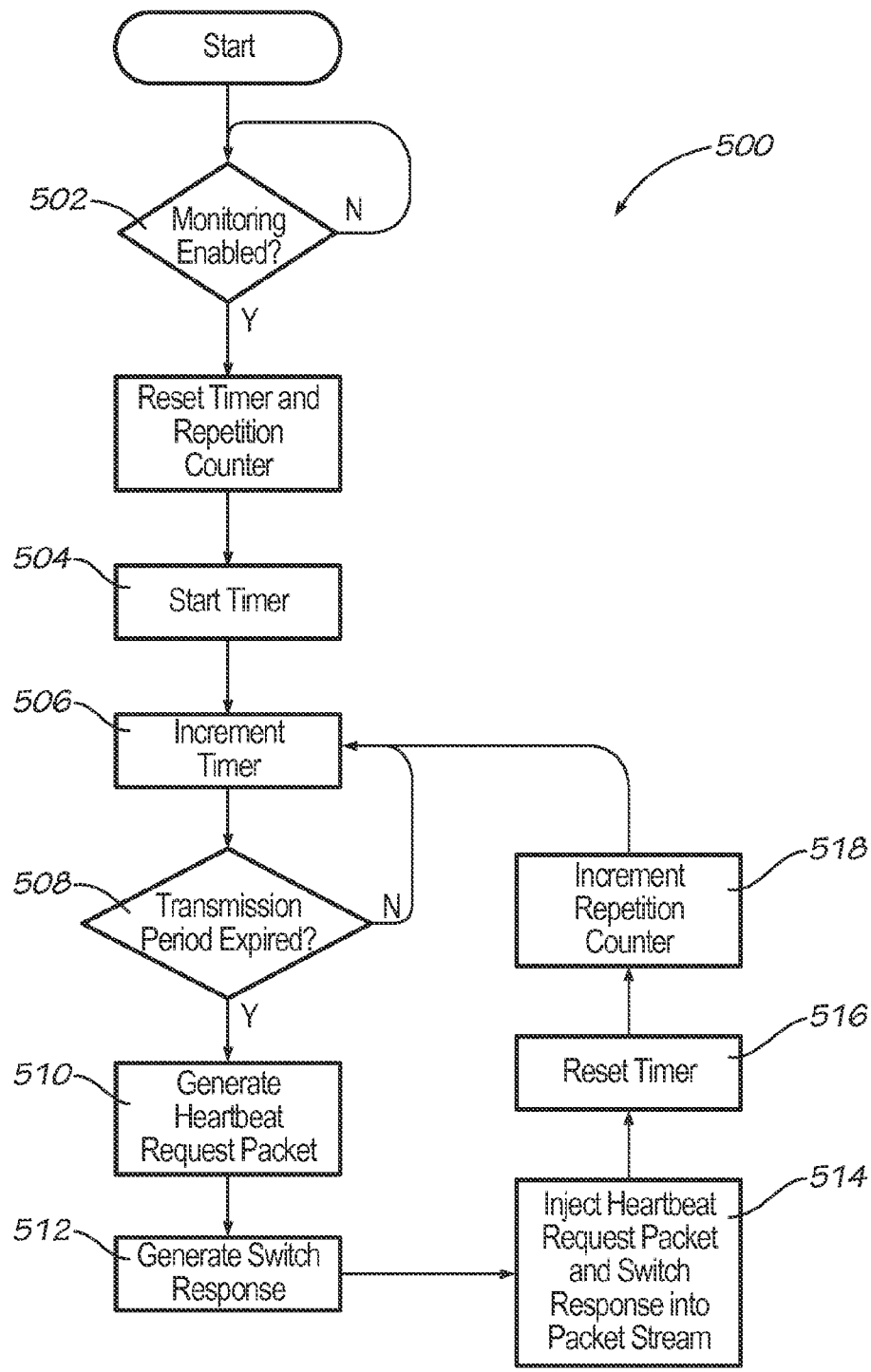
FIG. 5 is a flow diagram showing, in accordance with the exemplary embodiment of the invention, exemplary process steps of an upstream communications network node performing protected session monitoring.
Figure 6:
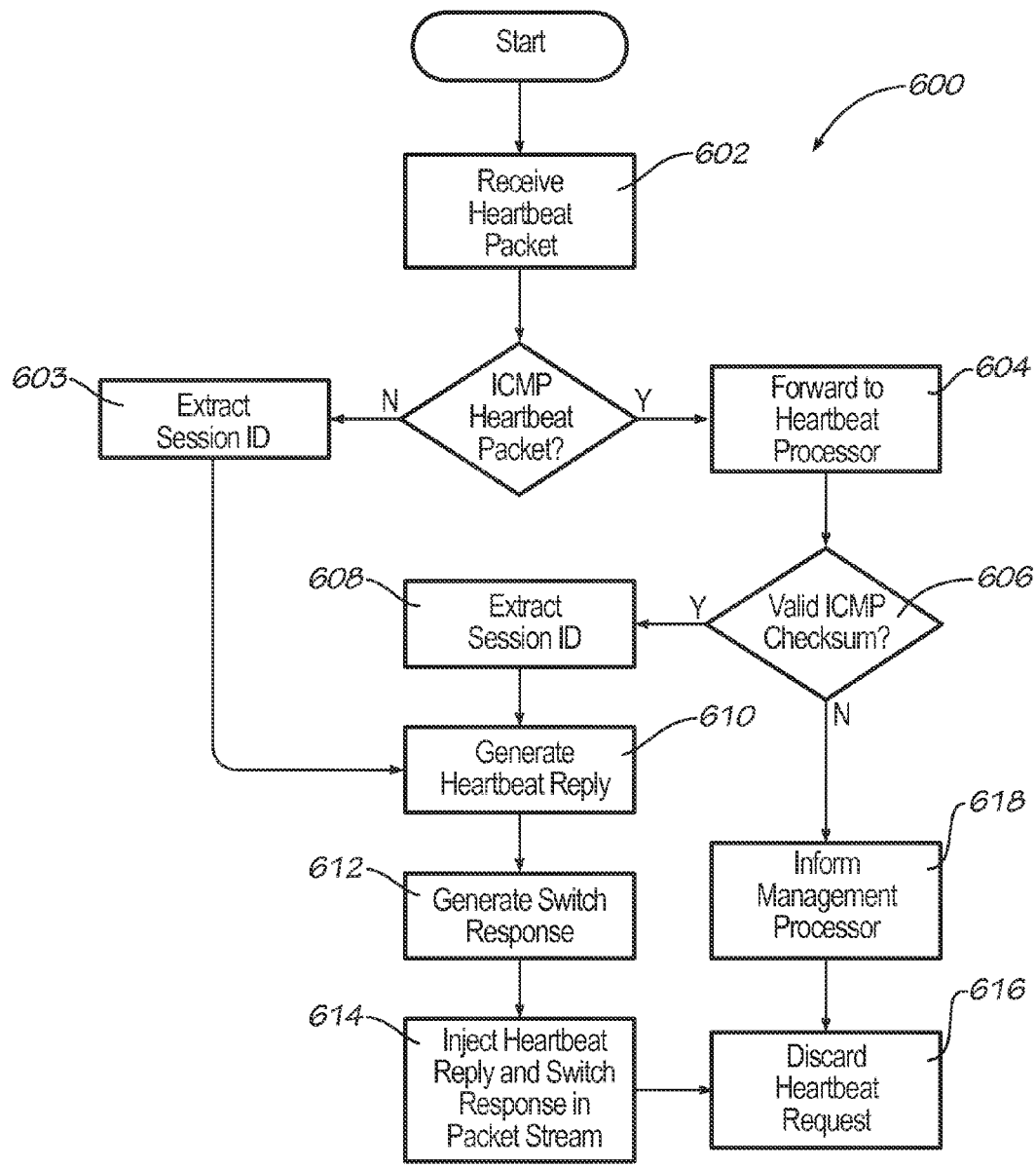
FIG. 6 is a flow diagram showing, in accordance with the exemplary embodiment of the invention, exemplary process steps of a downstream communications network node replying to heartbeat requests.

In accordance with the exemplary embodiment of the invention, the "source" switch/router node 110-1 upstream with respect to a protected transport path 102 periodically generates and transmits heartbeat request messages encapsulated into heartbeat packets 116 to probe the status of the communication network infrastructure encountered along the protected transport path 102. Making reference to FIG. 5, for each monitored transport path 102, the failover functionality 500 of the upstream SR node 110-1 includes:

If Enable flag=1 (502), then start the transmission timer (504) which is incremented 506 at a programmable rate as mentioned above; and (cyclical) Whenever the transmission timer reaches the transmission period 508, the heartbeat processor 204:
 i. Generates 510 a heartbeat request packet 116 for that session;
 ii. Generates 512 a switch response, specifying switching information used to forward the heartbeat request packet 116;
 iii. Injects 514 the heartbeat packet 116 and the corresponding switch response into the aggregate flow of packets at the switching/routing network node 110-1;
 iv. Resets 516 the transmission timer; and
 v. Increments 518 the repetition counter;

In accordance with the exemplary embodiment of the invention, the "destination" or "target" switch/router node 110-2 downstream with respect to the protected transport path 102 replies to received heartbeat request messages, the failover functionality 600 including:

forwarding 604 the received 602 heartbeat request packet 116 to the heartbeat processor 204, which if the packet has an ICMP format:
  i. verifies 606 the ICMP checksum;
  ii. if the checksum is correct, then the heartbeat processor 204:
    1) retrieves 608 the session ID from the packet header;
    2) generates 610 a heartbeat reply message for encapsulation in an ICMP heartbeat reply packet 118;
    3) generates 612 a switch response specifying switching information to be employed in forwarding the heartbeat reply packet 118;
    4) injects 614 the heartbeat reply packet 118 with the switch response into the packet flow at the switching/routing node 110-2; and
    5) discards 616 the received heartbeat request packet 116;
  iii. if checksum is incorrect (606), then the heartbeat processor 204 simply discards 616 the heartbeat request packet 116. Optionally, the heartbeat processor 204 may inform 618 the management processor of the bad heartbeat request packet 116 received.
  if the received 602 heartbeat request packet 116 has a generic format, then the heartbeat processor 204 and the process 600 resumes from step 610.

In accordance with the exemplary embodiment of the invention, The "destination" or "target" switch/router node 110-2 downstream with respect to the protected transport path 102 sends heartbeat reply messages encapsulated in heartbeat packets 118 back to the SR node 110-1. When a heartbeat reply packet 118 is received at the SR node 110-1, the classifier 202 forwards it to the heartbeat processor 204.

Figure 7:
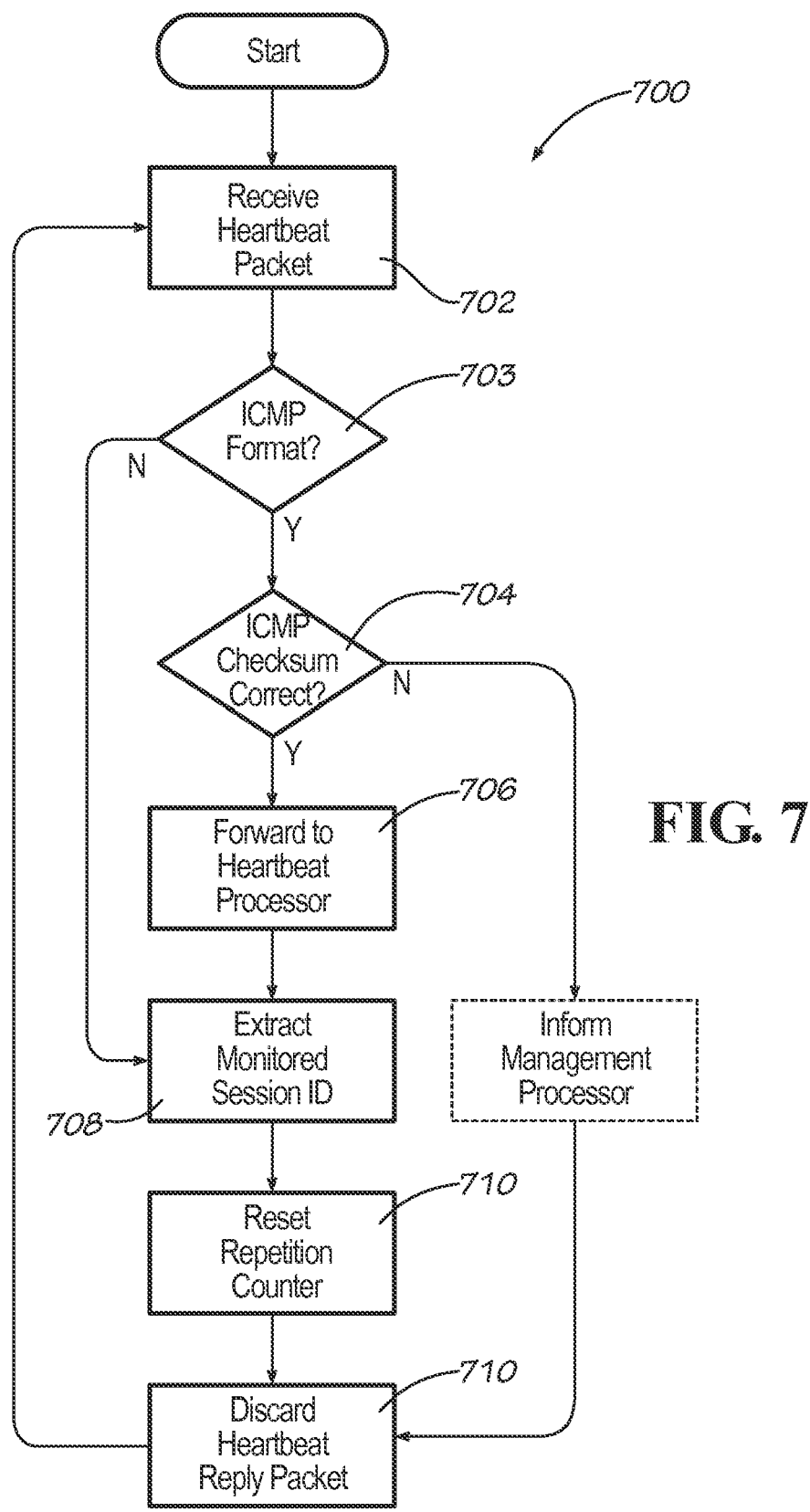
FIG. 7 is a flow diagram showing, in accordance with the exemplary embodiment of the invention, exemplary process steps of an upstream communications network node processing heartbeat reply messages encapsulated in a heartbeat packet.

Making reference to FIG. 7, for heartbeat packets 118 having an ICMP format the failover functionality 700 of the heartbeat processor 204 further includes:

forwarding 706 the received 702 to the heartbeat processor 204 if the ICMP checksum is correct (704);
extracting 708 the monitored session ID from the packet header;
resetting 710 the repetition counter for that session; and
discarding 712 the heartbeat replay packet 118.

If ICMP checksum is incorrect, then the heartbeat processor 204 discards the received reply heartbeat packet 118, with taking further action.

If the received heartbeat reply packet 118 has a generic format, then the failover functionality of heartbeat processor 204 includes:

extracting 708 the session ID from a location provided by the classifier 202;
resetting 710 the repetition counter for that session; and
discarding the heartbeat reply packet 118.

As described above the heartbeat processor 204 determines that a session is affected by a network failure if no heartbeat reply packets 118 have been received in response to a periodic sequence of N heartbeat request packets 116, where N is configured for each monitored session.

In accordance with the exemplary embodiment of the invention, if the value in the repetition counter exceeds the repetition threshold, then the heartbeat processor 204 sends a signal to the classifier 202, indicating that the session is experiencing a failure. The signal will contain the corresponding flow ID 210 employed by the classifier 202 to identify the flow (210) for which the corresponding failover transport path 112 should be used. The heartbeat processor 204 also sends an interrupt to the management processor associated with the switch/router node 110-1.

When the classifier 202 receives the switchover signal from the heartbeat processor 204, the classifier 202 thereafter sets the FLOVE-H bit in the corresponding flow entry 212 of the flow action table 214 to logic high "1". As a result, subsequent data packets 104 for that flow will be forwarded to the failover module 206 for address remapping as described above.

High speed failover functionality is provided by the exemplary hardware implementation described herein above: the only delay incurred relates to the time needed to recognize that a network failure has occurred. This delay in detection is the product of the transmission interval between consecutive heartbeat requests, and the number of transmissions (without a corresponding reply) before failure has been asserted. Both parameters are programmable. Selecting optimal parameters involves tradeoffs which are left to design choice.

In accordance with another exemplary implementation of the invention, for applications where network resource utilization overhead is an issue, a heartbeat request message may be embedded in data packet (104) headers, packets with constituent of monitored flows. A request that a target node send a reply could be encoded in a single bit, using any convenient field in preexisting headers of the conveyed data packets 104. Substantially identical mechanisms to those described above could be employed: with the notable difference that no special heartbeat packets are processed and the timing mechanism for heartbeat generation triggers on the expiration of time period during which a data packet for that stream including a bit set to logic high "1" indicating a heartbeat reply.

The embodiments presented are exemplary only and persons skilled in the art would appreciate that variations to the above described embodiments may be made without departing from the spirit of the invention. The scope of the invention is solely defined by the appended claims.

We claim:

1. A communications network node for performing one of packet switching and routing in processing packets associated with at least one communications session provisioned over a communications network, the network node comprising:
  a. a hardware classifier for associating one of at least one received data packet and at least one heartbeat packet embedded in a header of the data packet with a traffic flow corresponding to the communication session, wherein the heartbeat packet identifies the traffic flow;
  b. a hardware heartbeat processor for asserting that the traffic flow, identified in the heartbeat packet, is affected by a network failure based on information derived from the at least one heartbeat packet; and
  c. a hardware failover module for automatically switching each data packet associated with the affected flow onto a predefined failover transport path and performing an action in accordance with an action code and associated parameters, wherein the action code specifies an action to be performed on one of the heartbeat packet and data packets associated with the affected flow.

2. The network node claimed in claim 1, further comprising classifier means for identifying a heartbeat packet and for forwarding the heartbeat packet to the heartbeat processor.

3. The network node claimed in claim 1, wherein the heartbeat processor further comprises:
  a. heartbeat packet generation means for generating one of a heartbeat request packet and a heartbeat reply packet;
  b. transmission means for transmitting one of the heart request packet and the heartbeat reply packet;

c. a timer for tracking the length of time elapsed since the transmission of the last heartbeat request packet; and d. a first threshold register for specifying the length of time between heartbeat request packet transmissions.

4. The network node claimed in claim 3, wherein the heartbeat processor further comprises:

a. a repetition counter for counting the number of heartbeat request packets transmitted since the last heartbeat reply packet was received; and b. a second threshold register for specifying a maximum number of heart beat packets transmitted since the last heartbeat reply packet was received.

5. The network node claimed in claim 1, wherein heartbeat packets have one of an Internet Control Message Protocol format and a generic format.

6. A method of providing end-to-end failover protection for a monitored session provisioned across a communications network over a transport path, the method comprising:

a. at a communications network node, generating a heartbeat request packet embedded in a header of a data packet based on information held in packet headers of packets conveyed in respect of the monitored session, wherein the heartbeat request packet identifies the traffic flow;

b. transmitting the heartbeat request packet addressed to a destination network address specified in the headers of the packets conveyed in respect of the monitored session;

c. selectively asserting that the monitored session is affected by a network failure encountered in the transport path across the communications network;

d. switching data packets associated with the affected monitored session to a corresponding failover transport path; and e. performing an action in accordance with an action code and associated parameters, wherein the action code specifies an action to be performed on one of the heartbeat packet and the packets conveyed in respect of the monitored session.

7. The method claimed in claim 6, further comprising transmitting subsequent heartbeat packets periodically.

8. The method claimed in claim 7, wherein a time is employed to define a time period between consecutive heartbeat packets.

9. The method claimed in claim 7, wherein asserting that the monitored session is affected by the network failure, the method further comprises asserting that the monitored session is experiencing the network failure if a heartbeat reply packet corresponding to the transmitted heartbeat request packet was not received during a predetermined period of time.

10. The method claimed in claim 7, wherein asserting that the monitored session is affected by the network failure, the method further comprises asserting that the monitored session is experiencing the network failure if a heartbeat reply packet was not received following the transmission of a plurality of sequential heartbeat request packets.

11. The method claimed in claim 10, wherein asserting that the monitored session is experiencing the network failure if a heartbeat reply packet was not received following the transmission of a plurality of sequential heartbeat request packets, the method further includes:

a. incrementing a repetition counter with each heartbeat request packet transmitted; and b. resetting a repetition counter associated with the monitored session whenever a heartbeat reply packet is received.

12. The method claimed in claim 6, further comprising a prior step of provisioning the failover transport path.

13. The method claimed in claim 6, further comprising:

a. receiving one of a data packet and a heartbeat packet associated with the monitored session; and b. forwarding the received heartbeat packet to a heartbeat processor.

14. The method claimed in claim 13, wherein selectively asserting that the monitored session is affected by a network failure is determined from processing heartbeat packets.

15. The method claimed in claim 6, wherein switching data packets associated with the affected monitored session to a corresponding failover transport path further comprises substituting a destination Media Access Control (MAC) address in each packet header associated with the affected session with a destination MAC address associated with the failover transport path.

16. The method claimed in claim 6, wherein switching data packets associated with the affected monitored session to a corresponding failover transport path further comprises:

a. substituting a destination Media Access Control (MAC) address in each packet header associated with the affected session with a destination MAC address associated with the failover transport path; and b. substituting a destination Internet Protocol (IP) address in each packet header associated with the affected session with a destination IP address associated with the failover transport path.

17. A system for providing end-to-end failover protection for a monitored session provisioned across a communications network over a transport path, the system comprising:

a. means for generating a heartbeat request packet embedded in a header of a data packet based on information held in packet headers of packets conveyed in respect of the monitored session, wherein the heartbeat request packet identifies a traffic flow;

b. means for transmitting the heartbeat request packet addressed to a destination network address specified in the headers of the packets conveyed in respect of the monitored session;

c. means for selectively asserting that the monitored session is affected by a network failure encountered in the transport path across the communications network; and d. means for switching data packets associated with the affected monitored session to a corresponding failover transport path and for performing an action in accordance with an action code and associated parameters, wherein the action code specifies an action to be performed on one of the heartbeat packet and packets conveyed in respect of the monitored session.

18. The system of claim 17, further comprising means for asserting that the monitored session is experiencing the network failure if a heartbeat reply packet corresponding to the transmitted heartbeat request packet was not received during a predetermined period of time.

19. The system of claim 17, further comprising means for asserting that the monitored session is experiencing the network failure if a heartbeat reply packet was not received following the transmission of a plurality of sequential heartbeat request packets.

20. The system of claim 17, wherein means for switching data packets associated with the affected monitored session to a corresponding failover transport path and for performing an action in accordance with an action code and associated parameters further comprises:

a. means for substituting a destination Media Access Control (MAC) address in each packet header associated with the affected session with a destination MAC address associated with the failover transport path; and
b. means for substituting a destination Internet Protocol (IP) address in each packet header associated with the affected session with a destination IP address associated with the failover transport path.

* * * * *